UNITED STATES PATENT OFFICE.

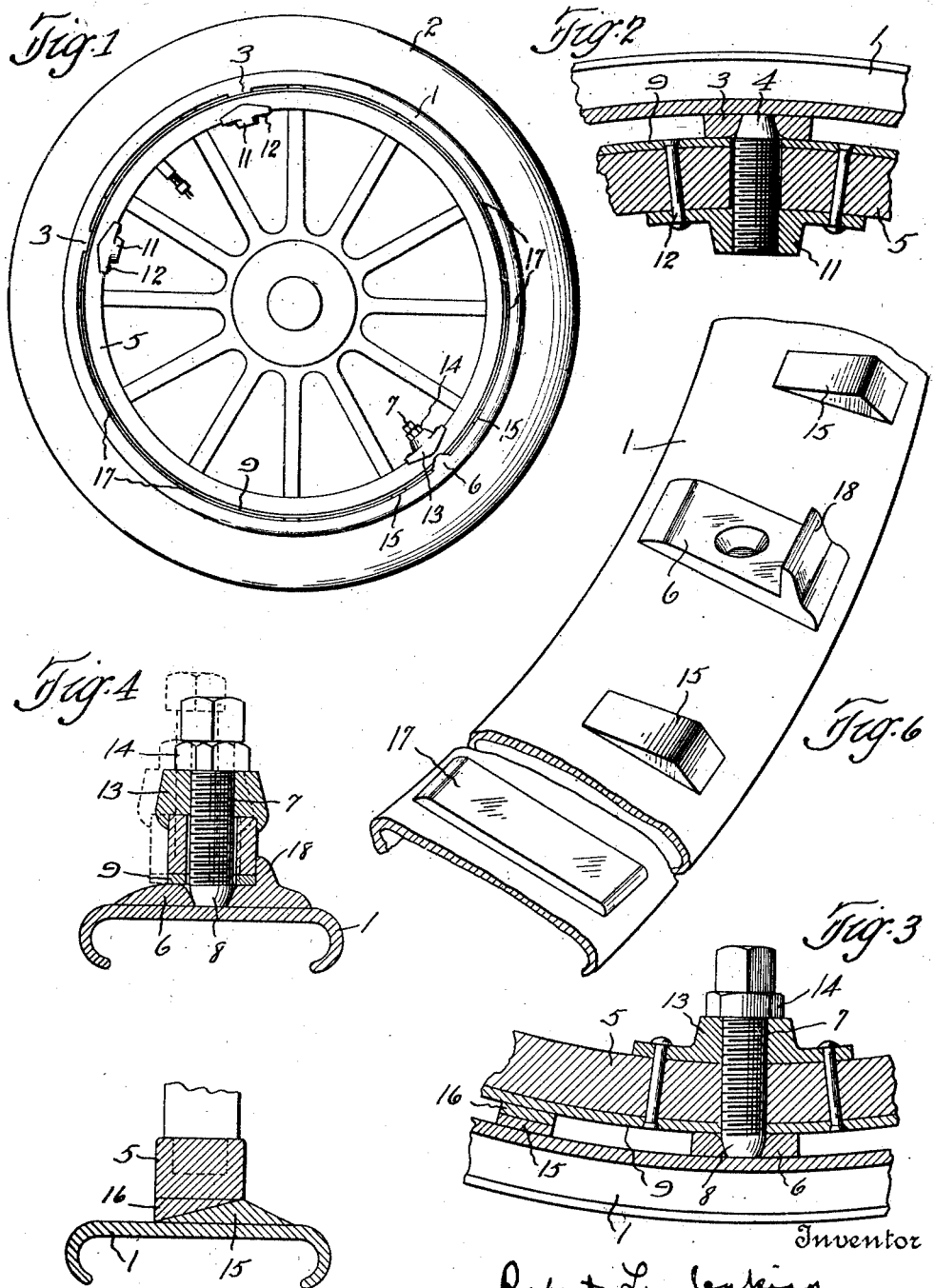

ROBERT L. JENKINS, OF RICHMOND, VIRGINIA, ASSIGNOR TO GEORGE L. CHRISTIAN, JR., OF RICHMOND, VIRGINIA.

DEMOUNTABLE RIM FOR WHEELS.

1,372,230. Specification of Letters Patent. Patented Mar. 22, 1921.

Application filed May 19, 1920. Serial No. 382,529.

*To all whom it may concern:*

Be it known that I, ROBERT L. JENKINS, a citizen of the United States, residing at Richmond, in the county of Henrico and State of Virginia, have invented certain new and useful Improvements in Demountable Rims for Wheels, of which the following is a specification.

This invention relates to vehicle wheels, and it relates particularly to the construction of wheels intended for use on motor vehicles permitting the removal and attachment of rims to which pneumatic tires are connected.

The object of the invention is to provide in a wheel of the kind referred to, a construction whereby the removal of a rim and tire and the substitution of others, can be accomplished by the quick and easy manipulation of a minimum number of parts.

Having the above object in view the invention consists in the novel general construction and arrangement of the parts employed whereby the introduction or removal of one securing screw a rim may be securely attached to or removed from a felly.

The invention is capable of embodiment in various forms and one of these is illustrated in the accompanying drawing. In the drawing;

Figure 1 is a side elevation of an automobile wheel in which the means for attaching and detaching the rim in accordance with my invention is incorporated;

Fig. 2 is a sectional view showing portions of a rim and felly of a wheel and a portion of the means for detachably securing the parts together;

Fig. 3 is a sectional view showing portions of the rim and felly and the screw bolt by which the rim is moved laterally of the felly and secured to the latter;

Fig. 4 is a sectional view showing portions of the rim and felly and the screw bolt by which the rim is moved laterally of the felly and secured to the latter, the parts being shown by dotted lines in positions at the beginning of the introduction of the bolt, and by full lines the positions assumed by the parts when the securing bolt is seated;

Fig. 5 is a transverse sectional view showing portions of the felly and rim and the wedge-shaped projections on these parts; and, Fig. 6 is a perspective view of a portion of the rim showing the socket for the securing bolt, the wedge-shaped projections, and the projections against which the outer face of the wheel member bears when the parts are in position for use.

In the drawing 1 represents a rim of a wheel which is provided with suitable means to accomplish the securing to it of the tire 2. The inner face of the rim is provided at one side with one or more sockets 3 adapted to receive projections 4 extending from the outer face of the felly 5. In the form of the device herein shown two sockets 3, and a corresponding number of projections 4 are used. The inner face of the rim substantially opposite the sockets 3 is provided with a socket 6 adapted to receive the end of a securing screw 7 which extends through the felly and is movable to cause its end to project from the outer face of the felly. The socket 6 is tapered from its outer to its inner end in order that when the tapered or rounded end 8 of the screw 7 is introduced into the opening, the rim will be caused to move laterally of the felly. In the embodiment of the invention herein shown, the sockets 3 and 6 are formed in projections or lugs extending from the inner face of the rim.

The felly 5 forming part of the wheel member is preferably provided on its outer face with a metallic surrounding ring 9 secured to the felly in any suitable way. The projections 4 are in the form of screws each passing through sockets 11 having a screw threaded opening through it and attached to the felly or formed therewith, as by rivets 12. The outer ends of the projections 4 are preferably reduced or rounded in order to facilitate their ready introduction into the sockets 3 in the inner face of the rim.

The securing screw 7 passes through the felly and preferably extends through an interiorly screw threaded socket 13 secured to the felly. The end 8 of the screw is rounded or tapered and corresponds substantially in shape to that of the bottom of the socket 6 in the inner face of the rim. Arranged on the screw 7 is a locking nut 14 which when the securing screw is moved to a position to connect the tire and felly, is turned down to bear firmly upon the outer face of the socket 13 and thus to effect the locking of the securing screw against turning.

The projection in which the socket 6 is formed has extending inward from its outer portion a lip 18 so located that when the rim is moved laterally of the felly and reaches its position for use, the felly bears against the lip and is retained in proper place thereby.

The inner face of the rim has formed with or secured to it lugs 15, the faces of which incline from their outer to their inner ends, and the outer face of the wheel member is provided with corresponding lugs, 16, having their faces oppositely inclined and so located as to bear upon those of the rim as the parts are brought to and secured in position for use. As herein shown two pairs of lugs 15 and 16 are employed and they are secured one pair on each side of the socket 6. It will be apparent from an understanding of the invention that both the felly and rim may be provided around the respective parts with any desired number of the inclined lugs oppositely arranged and located at suitable distances apart. The combined thickness of the contacting inclined lugs corresponds to the distance which the projections in which the sockets for receiving the projections 4 and the attaching screw are formed, extend inward from the face of the rim.

The inner face of the rim is provided at intervals with lugs 17 against which the felly bears when the rim is attached to the felly, the height of the lugs corresponding to the combined thicknesses of the inclined lugs described.

In securing a rim in place it is brought to a position to cause the lugs 4 extending from the felly to enter the sockets 3 in the inner face of the rim; the opposite side of the rim is then moved inward bringing the end of the securing screw over the outer portion of the tapered opening 6. The screw is then turned to cause it to enter the socket 6, and by reason of the shape of the latter the rim is moved inward and the tapered lugs on the rim are moved over those on the felly imposing tension on the rim. The parts are so formed that when the securing screw is seated the rim bears firmly both upon the inclined lugs and upon those arranged at intervals around the rim.

When the securing screw is seated the locking nut is turned to cause it to bear firmly on the face of the socket, thus preventing turning of the securing screw to loosen it by jarring to which the wheel is subjected in use.

To remove the rim the securing screw is turned to withdraw its end from the tapered socket. As the screw is withdrawn the tension imposed upon the rim in securing it in place is relieved with the result that the return of the rim, by reason of its resiliency, to its normal form will cause the inclined lugs of the rim to move outward over those of the felly loosening the rim from the felly and permitting the rim to be removed without the exertion of force.

I claim:

1. A device of the kind described comprising means for detachably securing a rim to a wheel member at one side, the rim and wheel member being each provided at a point substantially opposite the detachable securing means with inclined portions adapted to contact and with means for connecting the rim and wheel member and for moving the rim laterally, the rim between the securing means being unattached to the wheel member.

2. A device of the kind described comprising means for detachably securing the rim to the wheel member at one side, the rim and wheel member being each provided at a point substantially opposite the detachable securing means with inclined portions adapted to contact, one part being provided with a socket and the other part being provided with a projection adapted to enter the socket, the meeting faces of the socket and projection being at an angle to each other, whereby as the projection is introduced into the socket the rim is caused to move laterally.

3. A device of the kind described comprising a rim having sockets on its inner face and provided on the opposite portion of its inner face with a tapered socket, a wheel member having projections adapted to enter the sockets extending from its outer face at one side, and being provided on its opposite side with a securing screw adapted to enter the tapered socket on the inner face of the rim, the rim and wheel member being provided with oppositely inclined contacting projections.

4. A device of the kind described comprising a rim having sockets on its inner face at one side and provided on the opposite side of its inner face with a tapered socket, a wheel member having projections adapted to enter the sockets extending from its outer face at one side, and being provided on its opposite side with a securing screw adapted to enter the tapered socket on the inner face of the rim, both the rim and wheel member being provided on opposite sides of the socket and screw with inclined lugs adapted to contact.

5. A device of the kind described comprising means for detachably securing a rim to a wheel member at one side, the rim and wheel member being each provided at a point substantially opposite the detachable securing means with inclined parts adapted to contact and with means for connecting the rim and wheel member and for moving the rim laterally, and lugs on the inner face of the rim between the securing means adapted to bear on the wheel member.

In testimony whereof I affix my signature.

ROBERT L. JENKINS.